United States Patent Office 2,915,531
Patented Dec. 1, 1959

2,915,531

PREPARATION OF 3-METHYL-3,5-DIHYDROXY-PENTANOIC ACID AND THE DELTA-LACTONE THEREOF

Donald E. Wolf, Princeton, and Carl H. Hoffman, Scotch Plains, N.J., assignors to Merck & Co., Inc., Rahway, N.J., a corporation of New Jersey No Drawing. Application July 12, 1956
Serial No. 597,329

4 Claims. (Cl. 260—343.5)

This invention relates to a method for the synthesis of racemic 3-methyl-3,5-dihydroxypentanoic acid and $\beta$-methyl-$\beta$-hydroxy-$\delta$-valerolactone. The invention also includes the lower esters of the above acid which are obtained as intermediates in the synthesis.

The subject acid and lactone and their salts and amides are useful in minute quantities for promoting the growth of Lactobacillus acidophilus ATCC 4963 and certain other lactobacilli employed in the production of lactic acid and cottage cheese. These compounds are also useful for promoting the growth of higher animals including chicks. The growth activity of the compounds made available by the new process can be determined by microbiological assay with Lactobacillus acidophilus ATCC 4963 essentially in accordance with known procedures. A description of the specific techniques we employ is presented in our related application, Serial No. 597,330, filed on the same day as the present application. It is convenient to measure growth activity in terms of "units." With the essentially conventional assay technique referred to above, one-half maximal growth of Lactobacillus acidophilus ATCC 4963 is obtained when the nutrient medium on which the Lactobacillus is grown contains 0.0005 unit of growth activity per ml. of solution.

The new synthesis comprises selectively partially reducing a lower diester of $\beta$-methyl-$\beta$-hydroxyglutaric acid to a lower ester of 3-methyl-3,5-dihydroxypentanoic acid and hydrolyzing that intermediate to the desired acid and lactone which normally occur as an equilibrium mixture. By "lower diester" we mean a diester of the substituted glutaric acid with a lower alcohol having from 1 to 6 carbon atoms. The dihydroxy lower monoester derivatives obtained by the partial reduction of the diester, therefore, also contain 1 to 6 carbon atoms in the ester group. We have discovered that the desired partial reduction of the diester can be accomplished with lithium aluminum hydride at temperatures materially lower than those normally employed, i.e., below about 0° C. or preferably at about $-30°$ to $-40°$ C. Temperatures as low as $-50°$ C. can be used with advantage provided that the solvent employed is sufficiently fluid at such temperatures. The lithium aluminum hydride employed is less than one mole of hydride for one mole of the diester, and preferably about one-half mole of hydride for one mole of the diester.

It has been found that the reaction product from the lithium aluminum hydride reduction of the diester contains small amounts of aldehydes in addition to the desired reduction products. These aldehydes can be further reduced to give additional dihydroxy monoester by hydrogenation with a platinum catalyst according to known procedures. This second reduction is not, however, an essential step in our process. The desired product from the lithium aluminum hydride reduction, a lower ester of 3-methyl-3,5-dihydroxypentanoic acid, can be hydrolyzed to the desired acid and lactone by any suitable method as, for example, by the use of barium hydroxide. The salts and amides of the acid obtained in this way are prepared by conventional procedures.

The method of the present invention for the separation of 3-methyl-3,5-dihydroxypentanoic acid, including the preparation of the ester intermediates and the preparation of the salts and amides of the acid, are described in detail in the following examples.

EXAMPLE I

Reduction of diethyl $\beta$-hydroxy-$\beta$-methylglutarate to ethyl 3-methyl-3,5-dihydroxypentanoate and hydrolysis of the latter to 3-methyl-3,5-dihydroxypentanoic acid and $\beta$-hydroxy-$\beta$-methyl-$\delta$-valerolactone A solution of diethyl $\beta$-hydroxy-$\beta$-methylglutarate (2.18 g., 10 millimoles) in approximately 15 ml. of anhydrous ether was prepared and placed in an apparatus designed to protect the contents from moisture. The solution was cooled to about $-30°$ to $-40°$ C. (inside temperature) while 5.9 ml. of an ethereal solution of lithium aluminum hydride (containing approximately 5 millimoles of active LiAlH$_4$) was added with vigorous agitation over a period of about 15 minutes. The reaction mixture was allowed to stand without further cooling for about 2 hours and then vigorously agitated with about 2 ml. of water and treated with excess anhydrous magnesium sulfate to remove the moisture. The mixture was filtered and the filtrate was evaporated, leaving an oil containing a substantial proportion of ethyl 3-methyl-3,5-dihydroxypentanoate. This oil, upon hydrolysis with alkali (barium or sodium hydroxide), produced a mixture of 3-methyl-3,5-dihydroxy pentanoic acid and $\beta$-hydroxy-$\beta$-methyl-$\delta$-valerolactone. This mixture, when assayed, was found to promote the growth of Lactobacillus acidophilus ATCC 4963.

The salts filtered from the ether solution above were treated with 100 ml. of water while cooled and acidified to about pH 4.5 with dilute hydrochloric acid. The solution was then evaporated to dryness under vacuum. The salt residue was made strongly acid by moistening with a little 6 N hydrochloric acid and concentrated to dryness without heating. The residue was then extracted twice with 100 ml. of boiling chloroform. The chloroform solution was filtered and concentrated to dryness leaving 0.50 g. of oily residue.

This oil (0.50 g.) showed a faint test with Schiff reagent. It was dissolved in 100 ml. of methanol, shaken for 2 hours with 0.1 g. of platinum oxide under 1 to 2 atmospheres of hydrogen and the catalyst removed by filtration.

The solution was evaporated to an oily residue which was treated with 50 ml. of 0.1 molar aqueous barium hydroxide solution and autoclaved for 1 hour at 15 p.s.i.g. of steam pressure. The solution, containing some insoluble barium salts, was cooled and treated with excess carbon dioxide (by bubbling a stream of the gas through the solution until it was essentially neutral) to remove excess barium and hydroxide. After filtration the solution of soluble barium salts was concentrated to a solid residue.

The crude barium salt was purified by dissolving in methanol, filtering and precipitating with acetone. The precipitate was dissolved in water and the barium ion removed by dropwise addition of 2 N sulfuric acid until the solution was slightly acid to test paper. The precipitate was then removed by centrifuging the mixture and decanting the supernatant liquid. The last traces of barium ion were removed from the supernatant solution by passing it over a column of sulfonic acid type ion exchange resin (Amberlite IR-120). The eluate collected from the column was strongly acid. This solution was evaporated at reduced pressure to yield the desired 3-methyl-3,5-dihydroxypentanoic acid as a slightly brown oil.

EXAMPLE II

*Preparation of 3-methyl-3,5-dihydroxypentanoic acid benzhydrylamide*

220 mg. of the oil obtained from working up the salts in Example I was treated with 0.4 mg. of benzhydrylamine and heated at 100° C. for 1.5 hours in a flask protected from moisture. The resulting benzhydrylamide was isolated by dissolving the reaction mixture in chloroform and extracting this solution successively with dilute hydrochloric acid, water, dilute aqueous sodium bicarbonate and finally with water. The chloroform solution was dried over magnesium sulfate and evaporated at reduced pressure. The benzhydrylamide was purified by dissolving it in benzene diluted with petroleum ether. A small amount of brown oil precipitated. The solution was decanted from this impure material and allowed to stand. Colorless crystals of the benzhydrylamide of 3-methyl-3,5-dihydroxypentanoic acid were deposited. The product, which was recrystallized from benzene-petroleum ether, had a melting point of 93°–95° C. This product assayed 37.5 units per mg.

EXAMPLE III

*Preparation of N,N'-dibenzylethylenediammonium bis (3,5-dihydroxy-3-methylpentanoate)*

The product of the present process, 3-methyl-3,5-dihydroxypentanoic acid, is advantageously employed in promoting the growth of chicks in the form of its salt with N,N'-dibenzylethylenediamine. This compound, which will be referred to as the "DBED salt," is prepared by dissolving the acid in water and treating it with a solution of N,N'-dibenzylethylenediamine in methanol. The resulting mixture is stirred and clarified, if necessary, by the addition of small portions of methanol. The mixture is then concentrated under vacuum with stirring to remove the bulk of the methanol. The aqueous phase is then extracted with chloroform to remove unreacted amine and the extract concentrated under vacuum to yield a salt. This salt is then dissolved in hot methanol and ether is added until the first turbidity appears. Additional ether is added after crystallization begins. The product DBED salt has a melting point of 124–126° C. DBED salts prepared in this manner normally have an activity of about 40–50 units/mg. when assayed by conventional procedures such as that described in our related application referred to above.

The DBED salt of 3-methyl-3,5-dihydroxypentanoic acid when used for the promotion of growth in chicks is added to a basal diet in very small amounts. For example, increased growth has been noted in chicks fed on a basal diet supplemented with 20 mg. of DBED salt (having 43 units of activity/mg.) per kg. of final diet. This amounts to only 0.002% DBED salt in the diet.

The above specific examples of the method and compounds of the present invention are merely illustrative and are not to be construed as limiting the scope of the invention.

We claim:

1. A process for the preparation of 3-methyl-3,5-dihydroxypentanoic acid and β-methyl-β-hydroxy-δ-valerolactone which comprises partially reducing a lower alkyl diester of β-methyl-β-hydroxyglutaric acid with substantially less than one mole of lithium aluminum hydride per mole of the diester at a temperature below about 0° C. to produce a lower alkyl monoester of 3-methyl-3,5-dihydroxypentanoic acid and hydrolyzing said monoester to the desired acid and lactone.

2. A process for the preparation of 3-methyl-3,5-dihydroxypentanoic acid and β-methyl-β-hydroxy-δ-valerolactone which comprises partially reducing diethyl β-methyl-β-hydroxyglutaric acid with about 0.5 mole of lithium aluminum hydride per mole of diester at a temperature of about −30° to −40° C. to produce ethyl 3-methyl-3,5-dihydroxypentanoate, converting said ethyl pentanoate to the barium salt and treating said salt with acid to liberate 3-methyl-3,5-dihydroxypentanoic acid and β-methyl-β-hydroxy-δ-valerolactone.

3. An ester of the formula

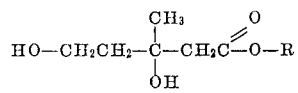

in which R is an alkyl radical containing 1–6 carbon atoms.

4. Ethyl 3-methyl-3,5-dihydroxypentanoate.

References Cited in the file of this patent

Barnett et al.: Biochem. J., vol. 36, pp. 357–63, 1942 (Chem. Abst., vol. 37, p. 345 [1] (1943)).

Arndt et al.: Ber. Deut. Chem., vol. 74B (1941), pp. 1460–4.

Paul: Chem. Abst., vol. 36 (1942), pp. 6140–1.

Adelberg: Chem. Abst., vol. 45 (1951), pp. 5233–4.

Bachmann et al.: J. Am. Chem. Soc., vol. 71 (1949), pp. 3222–3.